(12) United States Patent
Erickson

(10) Patent No.: US 6,715,195 B2
(45) Date of Patent: Apr. 6, 2004

(54) PLASTIC MOLDED FLUID MIXING EQUIPMENT

(75) Inventor: Craig M. Erickson, 7877 Alden Way NE., Fridley, MN (US) 55432

(73) Assignee: Craig M. Erickson, Fridley, MN (US)

(*) Notice: Subject to any disclaimer, the term of this patent is extended or adjusted under 35 U.S.C. 154(b) by 0 days.

(21) Appl. No.: 10/027,230

(22) Filed: Dec. 20, 2001

(65) Prior Publication Data

US 2002/0190519 A1 Dec. 19, 2002

Related U.S. Application Data (63) Continuation-in-part of application No. 09/481,006, filed on Jan. 10, 2000, now abandoned, which is a continuation-in-part of application No. 09/069,555, filed on Apr. 29, 1998, now Pat. No. 6,012,212.

(51) Int. Cl.[7] .................................................. B23P 11/00

(52) U.S. Cl. ........................ 29/434; 220/562; 239/172; 211/85.18; 248/154; 280/830; 280/833; 280/837; 280/839

(58) Field of Search ................................ 29/434, 898.07; 220/562, 563, 564, 567.2; 239/142, 146, 172, 173, 174; 366/279, 325.1, 325.7, 325.8, 325.9, 325.92, 325.93, 331; 211/85.18; 248/154; 280/830–831, 833–834, 837–839

(56) References Cited

U.S. PATENT DOCUMENTS

| | | | |
|---|---|---|---|
| 1,648 A | 6/1840 | Crowell et al. | |
| 75,539 A | 3/1868 | Fitch | |
| 458,610 A * | 9/1891 | Wyeth et al. | 220/562 |
| 656,123 A | 8/1900 | Kempf | |
| 1,732,829 A * | 10/1929 | Boardman | 248/146 |
| 1,816,028 A * | 7/1931 | Thwaits | 280/837 |
| 2,067,994 A * | 1/1937 | Thwaits | 220/562 |
| 2,105,302 A * | 1/1938 | Thwaits | 220/562 |
| 2,168,615 A * | 8/1939 | Bernstein | 220/562 |
| 2,226,713 A * | 12/1940 | Folmsbee | 105/362 |
| 3,009,644 A * | 11/1961 | Meadowcroft et al. | 239/78 |
| 3,054,525 A | 9/1962 | Silvis | |
| 3,058,753 A * | 10/1962 | Carlsen | 280/837 |
| 3,088,676 A * | 5/1963 | Nottingham | 239/78 |
| 3,131,949 A * | 5/1964 | Black | 280/837 |
| 3,604,719 A * | 9/1971 | Kerr | 280/839 |
| 3,650,501 A * | 3/1972 | Streb | 248/146 |
| 3,663,682 A | 5/1972 | Nitta et al. | |
| 3,880,438 A * | 4/1975 | Klein | 280/838 |
| 3,912,103 A * | 10/1975 | Gerhard | 220/1.5 |
| 3,919,373 A | 11/1975 | Kormendi | |
| 4,018,354 A * | 4/1977 | Lawler | 220/562 |
| 4,032,600 A | 6/1977 | MacAdams et al. | |
| 4,043,721 A | 8/1977 | Lemelson | |
| 4,135,724 A * | 1/1979 | Larsen | 280/830 |
| 4,285,903 A | 8/1981 | Lemelson | |
| 4,488,669 A | 12/1984 | Waters | |
| 4,552,460 A * | 11/1985 | Wallace | 366/196 |
| 4,625,892 A | 12/1986 | Carlin, Jr. | |
| 4,741,972 A | 5/1988 | Hardigg | |
| 4,877,327 A | 10/1989 | Whiteman, Jr. | |
| 4,955,956 A * | 9/1990 | Gerhard | 220/562 |
| 5,012,974 A | 5/1991 | Johnson | |

(List continued on next page.)

FOREIGN PATENT DOCUMENTS

FR 2082881 A * 10/1971 ............. B29C/1/00

*Primary Examiner*—Peter Vo
*Assistant Examiner*—Essama Omgba
(74) *Attorney, Agent, or Firm*—Patterson, Thuente, Skaar & Christensen, P.A.

(57) ABSTRACT

A material delivery system has a trailer with a deck and a plurality of tanks mounted thereon. In preferred embodiments, a main tank has curved lower sidewalls and a pair of lateral support tanks have concave curved sidewalls for laterally supporting the main tank. The lateral support tanks and main tank are anchored to the deck as is associated ancillary components.

8 Claims, 5 Drawing Sheets

U.S. PATENT DOCUMENTS

| | | | |
|---|---|---|---|
| 5,147,133 A | * | 9/1992 | White .................... 366/138 |
| 5,261,746 A | | 11/1993 | Boasso |
| 5,269,604 A | * | 12/1993 | Ewers .................... 366/277 |
| 5,445,783 A | | 8/1995 | Irish et al. |
| 5,480,191 A | * | 1/1996 | Litin et al. .............. 280/831 |
| 5,489,152 A | | 2/1996 | Rumph |
| 5,618,107 A | | 4/1997 | Bartsch |
| 5,891,385 A | | 4/1999 | Cerbelle et al. |
| 5,911,938 A | | 6/1999 | El et al. |
| 6,012,212 A | * | 1/2000 | Erickson .................. 29/434 |
| 6,062,417 A | * | 5/2000 | Evans .................... 220/563 |
| 6,290,086 B1 | * | 9/2001 | Franklin et al. ........... 220/564 |

* cited by examiner

PLASTIC MOLDED FLUID MIXING EQUIPMENT

This is a continuation-in-part of application Ser. No. 09/481,006, filed Jan. 10, 2000, now abandoned which is a continuation-in-part of application Ser. No. 09/069,555 filed Apr. 29, 1998 and issued Jan. 11, 2000 as U.S. Pat. No. 6,012,212. The above applications and patent are hereby incorporated by reference herein.

BACKGROUND OF THE INVENTION

This invention relates to methods of manufacturing tanks with agitation portions and tank trailer systems having a main tank and lateral support tanks. Trailer or skid mounted tanks are utilized in different industries such as asphalt sealing and hydro seeding. Efficient manufacture and assembly of these trailer tank combinations are needed.

With regard to asphalt sealing equipment, asphalt is comprised of essentially two components, aggregate and binder. The aggregate is a measured mixture of stone and sand while the binder is a petroleum derivative. The components are combined, heated and blended in a batch plant. The area where asphalt is to be laid is first prepared by grading and compacting the dirt. Gravel is laid on this area and compacted to a thickness of six to ten inches. The hot asphalt mix is then spread over the area and compacted to a uniform thickness of two to four inches.

As soon as new asphalt is laid, the binder begins to evaporate and decay as it is exposed to the damaging effects of the sun (oxidation), rain and snow. Gasoline, oil leaks and chemicals such as road salts can also have a dramatic effect on the life of the binder. As the binder is destroyed by these external factors, its ability to hold the aggregate together diminishes. This problem takes the form of cracks, distortion and disintegration of the asphalt surface. After three to five years under normal conditions, major deterioration has taken place.

Asphalt sealcoat liquid is a viscous brownish liquid that is applied in a thin layer to asphalt surfaces to protect same from deterioration. Sealcoat preserves the elastic and adhesive characteristics of the asphalt binder by sealing out the oxidizing effects of the sun, salts, and deteriorating effects of water and petroleum spillage. Sealcoat also dries to an attractive uniform flat black color creating a like new appearance. Sealcoat can also be mixed with sand to create a non-skid surface with increased wear characteristics. Sealcoat can also reduce loose stone on an asphalt surface. Generally, asphalt sealcoat is a highly economical method of maintaining and extending the life of asphalt surfaces.

The most common asphalt sealcoat is a water base solution of refine coal tar emulsion, gypsum, clay, and silica. Other additives are available to enhance particular characteristics of the sealer such as the adhesion characteristics, drying time, sand suspension, and the color of the sealer. Prior to application of the sealcoat, it is very important to have the asphalt liquid properly mixed and agitated.

Where an asphalt surface being covered is of substantial square footage it is very difficult to manually mix and agitate large quantities of the sealcoat liquid. Commercial applicators include a self-propelled piece of equipment with a hydraulically agitated tank, an associated pumping system for spraying the sealcoat onto the asphalt surface, and a series of squeegees on the machine. As the operator drives the machine forward, the squeegees drag across the surface leaving a thin, evenly applied layer of sealer on the asphalt. This type of equipment is very expensive and is difficult to use in confined areas.

Additionally, trailer mounted sealcoat application systems are known. Such systems include a large tank of two hundred gallons or more installed on the trailer along with ancillary equipment. The fluid in the tank is pumped through a hose and a spray nozzle for spray application of the sealcoat. Supplemental brushing or use of a squeegee may be performed as desired. It is particularly important with these relatively high quantities of sealcoat liquid that the liquid be properly agitated within the tank. Prior art tanks were typically constructed of steel. Also rotary molded tanks are known in which the agitation portion is assembled inside the blow molded drum through the top access opening. This type of assembly is tedious, time consuming, and difficult.

Fasteners such as inserts with threaded bores or the like which may be attached to the rotary mold portions prior to the mold process are known. Such fasteners are typically exposed at the outer surface of the tank after the molding process.

In industries other than asphalt sealcoating, large agitation tanks are also utilized to maintain slurries and proper agitation of fluids. For example, the hydroseeding industry in which seeds such as grass seed is sprayed from a nozzle onto a lawn to be seeded. Also in the earth drilling or boring industry, drilling fluid commonly known as mud is mixed from bentonite and must be constantly agitated and recirculated to maintain its desirable characteristics. In each of these industries the tanks are typically assembled from several components and agitation equipment is either assembled in the tank after the tank is completed or near completion or the parts are after partial assembly of the tank. Both of these industries would benefit from a tank with agitation means and capabilities that is more easily manufactured, less complicated, and easier to clean and maintain.

A need exists for a tank trailer system with several tanks mounted thereon in an efficient manner. Further, a multi tank trailer tank system that is relatively inexpensive to manufacture would be desirable.

SUMMARY OF THE INVENTION

In a preferred embodiment, an apparatus requiring storage of a liquid that needs agitation includes a plastic tank that is rotationally molded around an agitation portion. Additionally, lateral support tank side wall with a curvature that follows the curvature of the tank may be rotationally molded and be utilized as auxiliary tanks. The tank and auxiliary lateral support tanks are mounted on a trailer deck such as a skid or trailer. Various embodiments of the apparatus may be utilized in specific applications such as asphalt sealcoat applicators, hydroseed applicators, and bentonite or mud mixing apparatuses for earth drilling equipment.

An object and feature of the invention is that the lateral support tanks provide excellent lateral support for the main tank as well as providing additional tanks utilizing a minimizing amount of trailer deck surface. The asphalt sealcoat application system has such a plastic rotary molded tank mounted on a powered vehicle or trailer and utilizes a pump connected to a hose and spray wand for application of sealcoat on an asphalt surface. The tank is preferably formed of polyethylene resin and the agitation portion includes a plurality of paddles and a shaft extending from the interior of the tank for mixing the sealcoat liquid. The polyethylene tank is rotary molded around the assembled agitation portion. The invention includes the methodology of molding the tank, a tank molded by said methodology, and the apparatus for accomplishing said methodology.

The internal mold periphery and thus the finished molded tank is generally shaped as elongate cylinder. The agitation portion comprising a shaft extending coaxially with the axis of the tank is placed in the interior of the mold portions. After the mold process the shaft extends out both ends of the completed molded tank. Appropriately spaced threaded fasteners positioned around the exit of the shaft from the tank allow the fastening of a seal and bearing.

An advantage and feature of the invention is that the plastic rotationally molded tank is more economically manufactured than conventional plastic tanks.

A further advantage and feature of the invention is that the agitation portion may be unitary and integral, such as by welding, within the integral plastic tank which may have a very restricted tank opening. This provides for less maintenance and less failures of the agitation portion. Previous agitation portions placed in such integral plastic tank were assembled inside the tank after molding with fasteners such as nuts and bolts. The absence of nuts and bolts that hold the components of the agitation portion together minimizes excessive accumulation of sealcoat on the agitation portion.

A further advantage and feature of the invention is that the method may be used for multiple shafts each with separate agitation members extending from a single integral tank.

A further advantage and feature of particular embodiments of the invention that utilize the plastic saddles is that the saddle structure provides both a secure and robust constraint for the tank as well as providing auxiliary fluid tanks.

A further advantage and feature of particular embodiments of the invention is that the principal fluid storage components as well as the fluid agitation components of a asphalt sealing apparatus may all be rotationally molded providing durability and a relatively low manufacturing cost.

DETAILED SPECIFICATION

Figure 1:
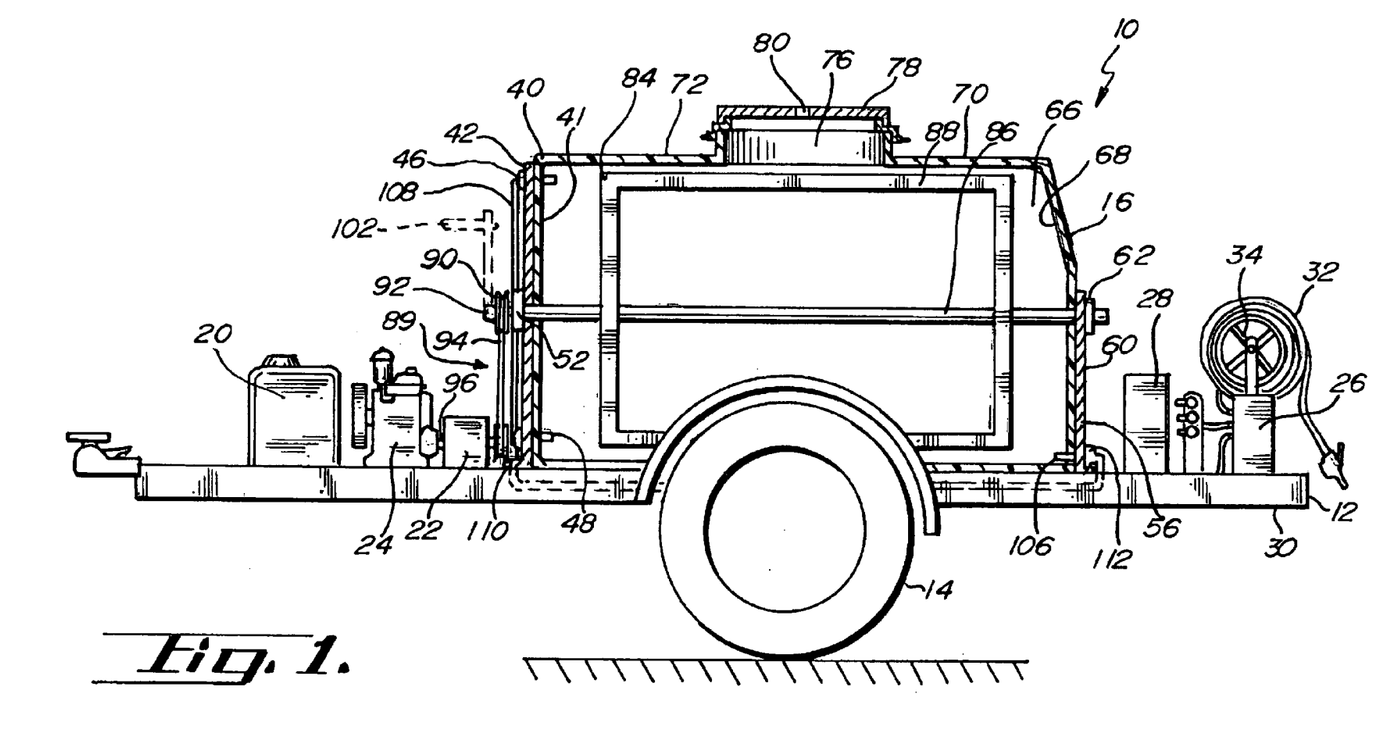
FIG. 1 is a front side elevational view of a trailer-mounted tank according to certain embodiments of the invention.
Figures 7, 8:
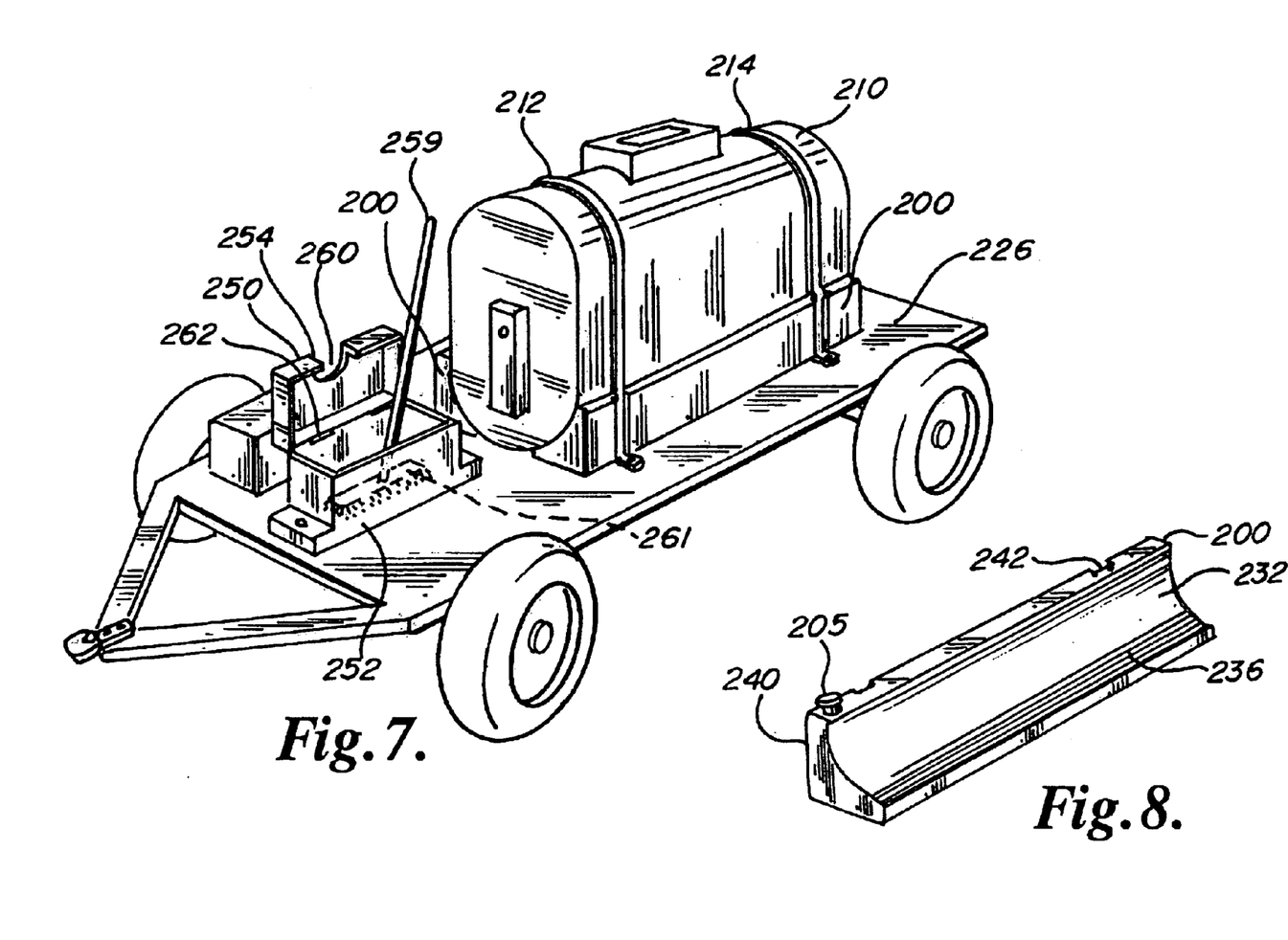
FIG. 7 is a perspective view of a sealcoat apparatus with molded plastic lateral support tanks and a molded plastic brush box.
FIG. 8 is a perspective view of one of the lateral support tank as shown in FIG. 7.

Referring to FIGS. 1 and 7, a material delivery system in accordance with the invention is shown and is generally designated with the numeral 10. Details of the main tank are shown in FIG. 1. The apparatus 10 comprises a trailer 12 with wheels 14 attached to a base or frame 15 which supports the rotationally molded main tank 16. Also mounted on the base 15 is a water tank 20, a hydraulic motor 22 driven by a gasoline engine 24, a fluid pump 26 which is driven by compressed air from an air compressor 28 and lateral support tanks. A hose 32 on a reel 34 is utilized to spray the sealcoat.

The main tank is elongate and substantially cylindrical shaped with a first end 40 which has a box portion 41 for facilitating attachment of a mounting bracket 42 and also an inlet port 46, an outlet port 48, and a seal/bearing 52. Similarly, the back end has a box portion 56 which facilitates attachment to the mounting bracket 60 and connection of the bearing and/or seal 62.

The tank has an open interior 66, an inner surface 68, and an exterior surface 70. Located at the top 72 of the tank is an access port 76 with a lid 78 with a vent 80. The access port is utilized for filling the tank and cleaning and maintaining the interior of the tank and components therein.

Positioned within the tank is an agitation portion 84 which comprises a shaft 86, a plurality of agitation members configured as paddles 88 welded to or otherwise suitably attached to the shaft 86. The agitation portion is rotated by way of a drive means 89 comprising a pulley 90 attached to the first end 92 of the shaft. The pulley is connected by way of a belt 94 or other suitable means to the motor 22. In this case the motor is a hydraulic motor in which hydraulic pressure is provided by way of a gasoline motor 24 and is coupled by way of a hydraulic line 96. Other drive means such as a more direct coupling to the gasoline motor, or an electric motor or a pneumatic motor are also included within the scope of the drive means. An alternative to a powered drive means as shown is a hand crank 102 shown in dashed lines. The inlet 46 and outlet 48 and 106 are suitably connected with tubing 108, 100, 112 to the liquid pump 26. Said tubing lines maybe placed within the frame of the trailer. The pump is suitably an air operated double diaphragm pump such as the M-2 or M-4 model pumps available from Wilden Pump and Engineering Company, 22069 Van Buren Street, Grand Terrace, California 92313.

Figure 2:
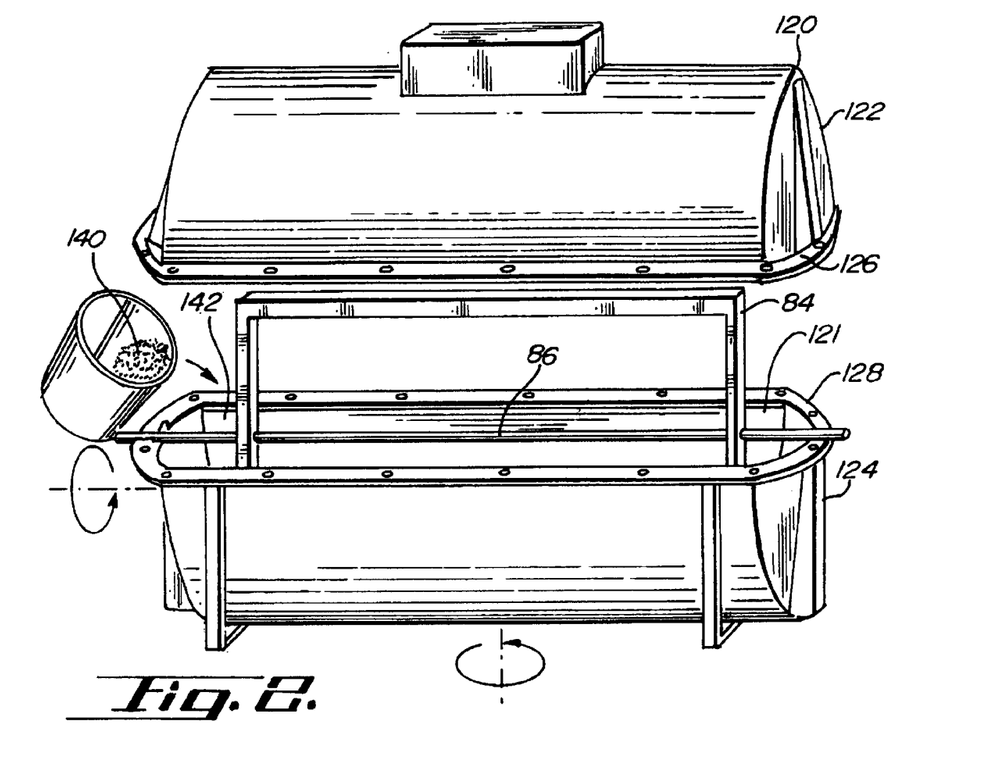
FIG. 2 is a perspective view of the mold portions to manufacture a tank consistent with aspects of the invention.

Referring to FIG. 2, details of the mold 120 in which the tank of FIG. 1 is manufactured are shown. The mold 120 has a mold cavity 121 and comprises a plurality of mold portions 122, 124. The mold portions engage together at their respective flanges 126, 128. The agitation portion 84 is placed within the open interior before closing of the mold portions. Additionally, before closing of the mold portions plastic resin 140 is provided in appropriate amounts to the mold cavity 142. The amount of resin provided is calculated to provide a suitable wall thickness of the finished tank. Three-eighths of an inch has been found to be suitable for sealcoat tank applications. Low density polyethylene resin is utilized in the preferred embodiment.

Figure 3:
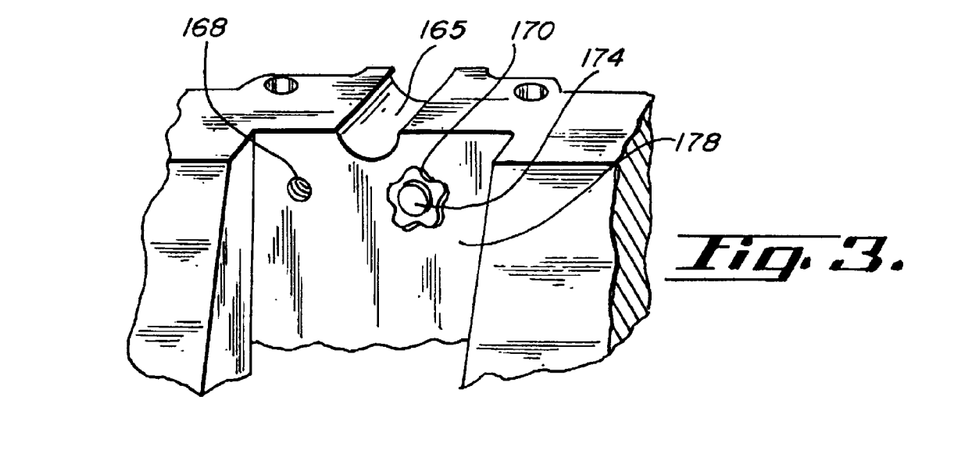
FIG. 3 is a detailed view of a section of a mold portion closing the exit point of the shaft from the mold.

Referring to FIG. 3 is a detailed view of an end of one of the mold portions illustrating a shaft receiving recess 165, an aperture 168 for use in securing in the mold cavity a threaded fastener 170. A bolt or stud which extends through the aperture to support the threaded fastener 170 adjacent to the interior surface 178 of the mold portion. When the resin flows about the interior surface 178 and hardens, the fastener is embedded in said plastic resin. The stud or bolt is then removed from the exterior of the mold leaving the threaded fastener to attach, for example, the monitoring bracket 60 and/or the bearing 62. The recess 165 has a corresponding recess on the upper mold portion not shown in this view.

Figure 4:
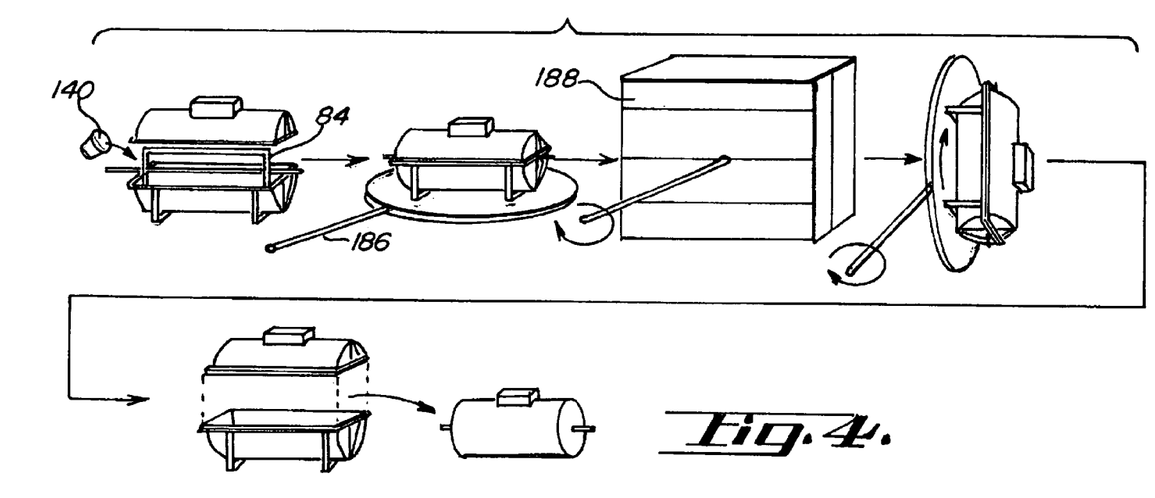
FIG. 4 is a schematic view of steps involved in certain aspects of the invention.

FIG. 4 shows a schematic view of fundamental steps involved in the method of manufacturing the tank with the internal agitation portion. After the addition of the resin 140 and the appropriate placement of the agitation portion 84 the mold portions are suitably sealed together and attached to a rotary mold fixture 186 for transport into an over 188. During the heating of the mold in two axis so that the melting resin will provide uniform coverage over the interior surfaces of said mold portions. After an appropriate time in the oven, the fixture moves the mold out of the oven and continues to rotate the mold during cooling. After the resin has cooled sufficiently, the rotation is stopped and the molded tank is removed from the mold.

Figure 5:
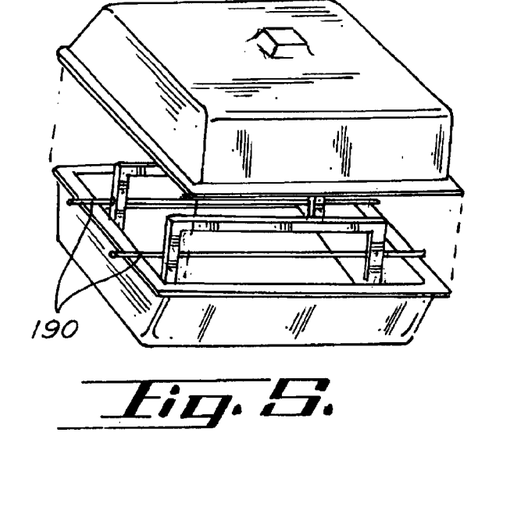
FIG. 5 is a perspective view of an additional tank mold in accordance with the invention.
Figure 6:
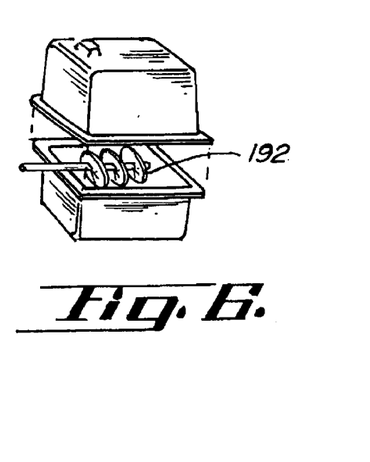
FIG. 6 is a perspective view of an additional tank mold in accordance with the invention.

Referring to FIGS. 5 and 6, additional molds are shown which illustrate that multiple agitation portions 190 may be utilized in a mold and that agitation members other than the straight paddles of FIGS. 1 and 2 are contemplated and included within the scope of the invention. FIG. 6 illustrates a spiral agitation member 192.

Figures 9, 10:
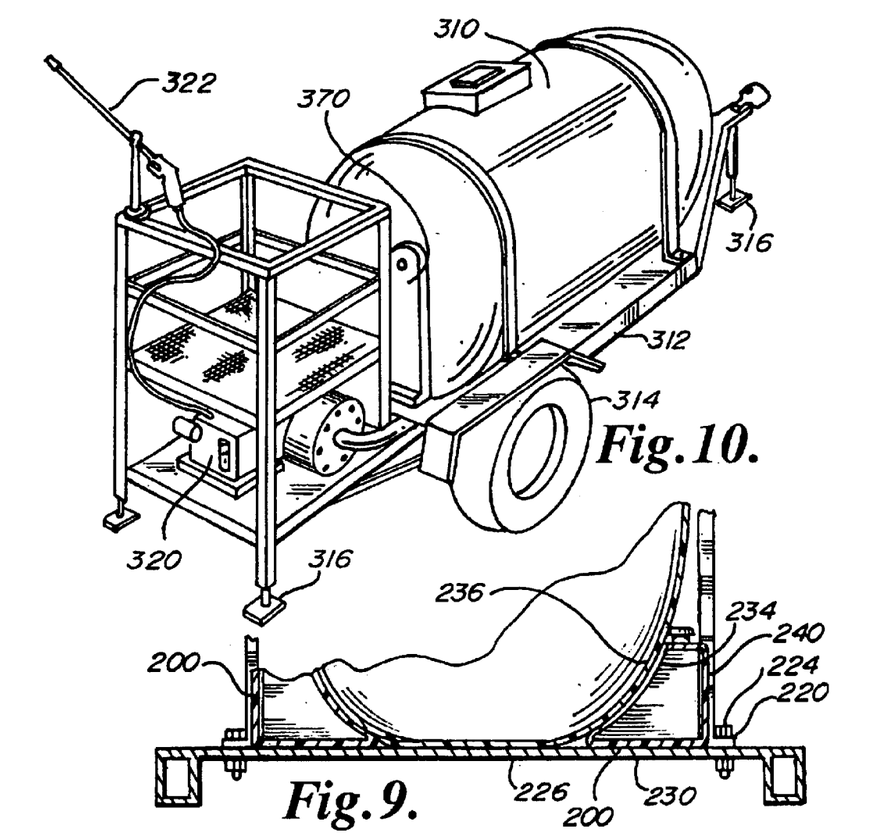
FIG. 9 is a cross sectional view showing the relationship of the base, lateral support tank, main tank, and U-shaped bracket.
FIG. 10 is a perspective view of a hydroseeding apparatus in accordance with the invention herein.

Referring to FIGS. 7, 8, and 9 a rotary molded tank with rotary molded lateral support or saddle tanks 200 is part of the attachment system are illustrated in the application of a driveway sealing apparatus as illustrated in FIG. 7 these saddles 200 are ideally rotary molded and as such are hollow and make a highly convenient auxiliary tank particularly suitable for storage of water and the like. Such tanks have a screw-on lid 205. A pair of saddles are utilized to support and restrain the tank 210. A pair of U-shaped mounting brackets 212, 214 are utilized to laterally restrain the mounting saddles and to provide downward holding pressure on the tank 210. The U-shape brackets are preferably fabricated from square steel tubing bent in the appropriate shape with mounting flanges 220 welded on the ends thereof. A nut and bolt arrangement 224 may be utilized to attach the bracket to the deck 226 of the trailer. The saddle may be conventionally rotary molded or maybe blow molding. In preferred embodiments, lateral support tank has a deck-engaging flat bottom 230 and a concave curved tank support portion 232 including a tank-engaging surface 236. An outwardly facing surface 240 of each saddle may appropriately have recesses 242 for receiving the U-shape bracket.

Also shown on FIG. 7 is a plastic rotary molded brush box 250 which is suitably rotationally molded from similar materials, such as polyethylene, as the tank and tank saddles. The brush box has a lower section 252 and a lid portion 254. Each portion is part of the single rotary molded piece and then a cut is made through the completed piece for separation and formation of the lid. A further cut out 260 is provided in the lid for receiving the handle 259 of the brush 261. Suitable hinges 262 are utilized to attach the lid to the body portion. Thus, as shown in FIG. 7 all major fluid storage components as well as the brush containment enclosure are and may all be made by rotational molding methods.

Figure 11:
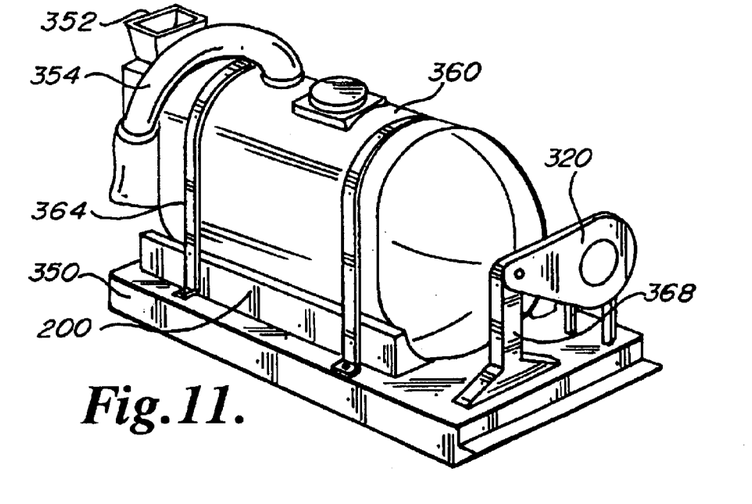
FIG. 11 is a perspective view of a skid-mounting bentonite mixing apparatus in accordance with the invention herein.

Referring to FIGS. 10 and 11 embodiments of the invention are shown in other suitable applications. FIG. 10 discloses a hydroseeding apparatus in which the cylindrical tank 310 is mounted on the base 312 configured as a trailer with wheels 314 and leveling pads 316. The hydrospray mechanisms 320 include a spray gun 322 as well as associated pumps and other specific equipment familiar to those in the art.

Referring to FIG. 11 an additional application of the invention herein is disclosed as a bentonite mixing apparatus in which drilling mud is mixed for earth drilling or boring operations. The apparatus comprises a base 350 configured as a skid a hopper 352 for dumping of dry bentonite mixing apparatus 354 and the tank 360 which includes the agitation mechanism not shown in this exterior perspective view. Cables or U-shaped brackets 364 may be utilized to anchor the tanks to the base 350. Ancillary supports 368 may be utilized to provide support to the shaft and agitation member.

Drive means 370 for rotating the internal agitation portions in both the embodiments of FIGS. 10 and 1, and other embodiments may be motor powered (i.e. hydraulic, electrical, pneumatic, or hydrocarbon powered).

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

I claim:

1. A method of manufacturing a tank mounted trailer assembly, the assembly comprising a trailer with a deck having a flat surface, the method of manufacturing comprising the steps of:
    a) rotationally molding a main tank of plastic, the tank having curved lower sides below a horizontal midline of the main tank and a first axis generally parallel to the curved lower sides;
    b) molding a pair of lateral support tanks, with each lateral support tank having a curved side to match the curved lower sides of the main tank, and a flat bottom side for placement on the flat surface of the trailer the lateral support tanks having a second long axis generally parallel to the curved sides and the flat bottom side;
    c) positioning the main tank on the flat surface of the trailer with the lateral support tanks placed intermediate the curved lower sides of the main tank and the flat surface of the trailer deck and with the curved sides of the lateral support tanks against the lower sides of the main tank below the horizontal midline and the first axis generally parallel to the second axis; and
    d) securing the main tank and the lateral support tanks to the trailer.

2. The method of claim 1 further comprising the step of positioning a shaft of an agitation portion in a mold assembly for the main tank before the main tank is rotationally molded.

3. The method of claim 2 further comprising the step of attaching paddles to the shaft of the agitation portion before the shaft is positioned in the mold assembly.

4. The method of claim 1 further comprising the step of extending the shaft of the agitation portion outwardly from the tank and the step of coupling the shaft to a power source.

5. A method of manufacturing a tank mounted trailer assembly, the assembly comprising a trailer with a deck, the method of manufacturing comprising the steps of:
    a) rotationally molding a main tank of plastic having curved lower sides below a horizontal midline of the main tank and a first axis generally parallel to the curved lower sides;
    b) molding a pair of lateral support tanks, with each lateral support tank having a curved side to match the curved lower sides of the main tank, and a flat bottom side for placement on the trailer, the lateral support tanks having a second long axis generally parallel to the curved sides and the flat bottom side;
    c) positioning the main tank on the trailer deck with the lateral support tanks placed intermediate the curved lower sides of the main tank whereby the tank is supported by the trailer deck and is laterally secured by the lateral support tanks and the trailer deck and with the curved sides of the lateral support tanks against the lower sides of the main tank below the horizontal midline and the first axis generally parallel to the second axis; and d) securing the main tank and the lateral support tanks to the trailer.

6. A material delivery system comprising:

a) a trailer with a deck having two sides and a midportion;

b) a molded plastic main tank for holding a liquid material, the main tank having a pair of curved lower side walls below a horizontal midline of the main tank and a first axis generally parallel to the curved lower sides, the main tank being centrally positioned on the midportion of the deck, the main tank anchored to the trailer;

c) at least one molded plastic lateral support tank positioned on the deck for providing lateral support to the main tank, the lateral support tank having a concave curved sidewall and a second long axis generally parallel to the curved side, the lateral support tank being positioned adjacent the main tank such that the curved side of the lateral support tank is against the lower side of the main tank below the horizontal midline and the first axis is generally parallel to the second axis; and d) a pump connected to the main tank for delivering the material in the main tank.

7. The material delivery system of claim 6 further comprising an agitation portion comprising a shaft extending into the main tank for agitating material therein, the agitation portion connecting to a drive motor for powering the agitation portion.

8. The material delivery system of claim 7 comprising a second lateral support tank and wherein the lateral support tanks directly engage the curved lower sidewalls of the main tank.

* * * * *